United States Patent
Truong et al.

(10) Patent No.: US 11,119,875 B2
(45) Date of Patent: Sep. 14, 2021

(54) COMMUNICATION PORT RECOVERY

(71) Applicant: Hewlett-Packard Development Company, L.P., Spring, TX (US)

(72) Inventors: Binh T Truong, Houston, TX (US); Nam H Nguyen, Houston, TX (US); Mark A Piwonka, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/606,892

(22) PCT Filed: Jun. 16, 2017

(86) PCT No.: PCT/US2017/037914
§ 371 (c)(1),
(2) Date: Oct. 21, 2019

(87) PCT Pub. No.: WO2018/231249
PCT Pub. Date: Dec. 20, 2018

(65) Prior Publication Data
US 2020/0097379 A1    Mar. 26, 2020

(51) Int. Cl.
*G06F 1/3287* (2019.01)
*G06F 11/22* (2006.01)
*G06F 9/4401* (2018.01)
*G06F 13/24* (2006.01)
*G06F 13/40* (2006.01)

(52) U.S. Cl.
CPC ........ *G06F 11/2284* (2013.01); *G06F 1/3287* (2013.01); *G06F 9/4411* (2013.01); *G06F 13/24* (2013.01); *G06F 13/4063* (2013.01)

(58) Field of Classification Search
CPC ........ G06F 1/3234; G06F 1/24; G06F 1/3041; G06F 11/3055; G06F 13/4027; G06F 11/2284; G06F 1/3287; G06F 13/24; G06F 13/4063
See application file for complete search history.

(56) References Cited

U.S. PATENT DOCUMENTS

| 7,039,047 | B1 | 5/2006 | Ajanovic et al. | |
| 2001/0044841 | A1* | 11/2001 | Kosugi | H04L 41/069 |
| | | | | 709/223 |

(Continued)

FOREIGN PATENT DOCUMENTS

WO    WO-2003023629 A1    3/2003

OTHER PUBLICATIONS

BitLocker Asks for a Recovery Key Every Boot, Mar. 6, 2017 < http://www.dell.com/support/article/us/en/19/SLN304584/bitlocker-asks-for-a-recovery-key-every-boot?lang=EN.

*Primary Examiner* — Raymond N Phan
(74) *Attorney, Agent, or Firm* — Brooks Cameron & Huebsch PLLC

(57) ABSTRACT

An apparatus may include a basic input/output system (BIOS) coupled to a controller. A communication port may be coupled to the controller. The controller may determine that the communication port has entered a locked state, send a first signal to the communication port to power off a bus associated with the communication port for a threshold period of time, and send a second signal to the communication port to power on the bus associated with the communication port in response to expiration of the threshold period of time.

19 Claims, 4 Drawing Sheets

(56) References Cited

U.S. PATENT DOCUMENTS

| | | | |
|---|---|---|---|
| 2008/0244107 A1* | 10/2008 | Uno | G06F 9/4411 710/15 |
| 2010/0088547 A1* | 4/2010 | Chang | G06F 11/2284 714/36 |
| 2010/0153641 A1* | 6/2010 | Jagadish | G06F 3/0685 711/114 |
| 2011/0107129 A1* | 5/2011 | Sinykin | G06F 3/0689 713/322 |
| 2013/0219202 A1* | 8/2013 | Iguchi | G06F 1/3246 713/323 |
| 2014/0268437 A1 | 9/2014 | Simonin | |
| 2015/0058509 A1* | 2/2015 | Uchida | G06F 13/362 710/200 |
| 2015/0067373 A1 | 3/2015 | Binh et al. | |
| 2016/0019116 A1 | 1/2016 | Gopal et al. | |
| 2016/0124816 A1 | 5/2016 | Huang | |
| 2016/0139995 A1 | 5/2016 | Takami | |
| 2016/0179722 A1 | 6/2016 | Nakanishi et al. | |
| 2017/0124011 A1 | 5/2017 | Verdino et al. | |
| 2020/0301496 A1* | 9/2020 | Higuchi | G06F 1/26 |

\* cited by examiner

COMMUNICATION PORT RECOVERY

BACKGROUND

An electronic device such as a computing system may include communication ports, which may be used to connect peripheral devices to the computing system. Communication ports may enter a locked state in which they may become unresponsive.

DETAILED DESCRIPTION

Figure 1:
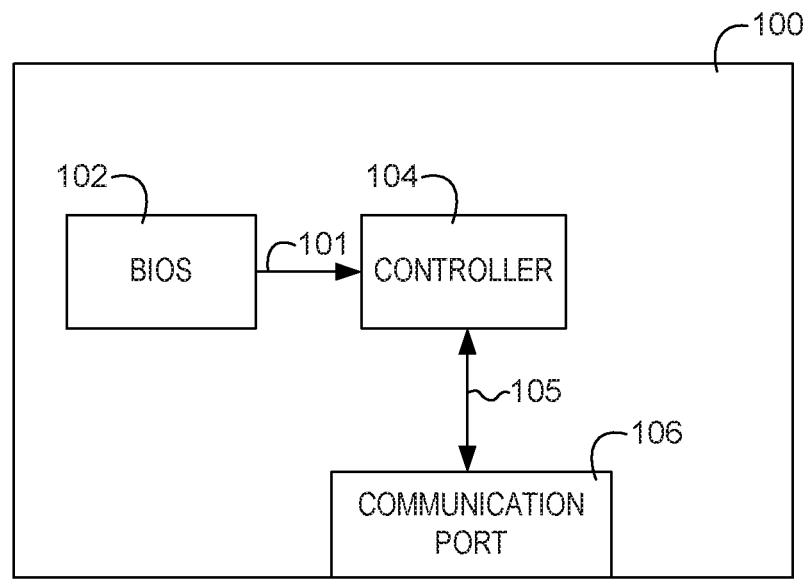
FIG. 1 illustrates an example of an electronic device including a basic input/output system, a controller, and communication port consistent with the disclosure.

An electronic device such as a computing system may include communication ports to facilitate connection of various peripheral devices to the computing system. As used herein, a "communication port" is a communication interface through which information is transferred between a computing system and a peripheral device. Non-limiting examples of communication ports include serial ports, parallel ports, universal serial (USB) ports, etc. Examples of peripheral devices that may be connected to a computing system via a communication port include pointing devices, network interface cards, finger print devices, printers, keyboards, display screens, USB devices (e.g., USB-C devices), portable media players, disk drives, network adapters, etc.

During operation of the computing system and/or peripheral devices, firmware and/or drivers associated with the communication ports may fail, thereby causing the communication port to enter a locked (e.g., failed or "hung" state). While in the locked state, the communication port may become unresponsive, rendering the peripheral device attached thereto unusable.

In some approaches, recovering a communication port from a locked state may include power cycling the computing system (e.g., initiating a complete power drain of the computing system). As used herein, "power cycling" refers to turning a device to an off state and then subsequently turning the device to an on state.

However, several drawbacks are associated with power cycling the computing system in order to recover the communication port from the locked state. For example, the computing system (as well as other peripherals connected to non-locked state communication ports) will be unusable during the power cycle. In addition, power consumption of the computing system may increase as the computing system is powered back on. Further, in some computing environments, such as distributed computing environments, it may not be feasible for a user to power cycle the computing system because they may not have access to the power supply for the computing system.

In contrast, some examples of the disclosure may allow for a communication port to be recovered from a locked state by power cycling the communications port without power cycling the computing system. In some examples, a command from the computing system basic input-output system (BIOS) may be generated to trigger a reset on a bus associated with the locked communication port, thereby recovering the communication port from the locked state without power cycling the computing system.

Examples of the disclosure include apparatuses, systems, and methods for relating to communication port recovery. In some examples, an apparatus may include a basic input/output system (BIOS) coupled to a controller. A communication port may be coupled to the controller. The controller may determine that the communication port has entered a locked state, send a first signal to the communication port to power off a bus associated with the communication port for a threshold period of time, and send a second signal to the communication port to power on the bus associated with the communication port in response to expiration of the threshold period of time.

The figures herein follow a numbering convention in which the first digit corresponds to the drawing figure number and the remaining digits identify an element or component in the drawing. For example, reference numeral 104 may refer to element "04" in FIG. 1 and an analogous element may be identified by reference numeral 204 in FIG. 2. Elements shown in the various figures herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense.

FIG. 1 illustrates an example of an electronic device 100 including a basic input/output system (BIOS) 102, a controller 104, and communication port 106 consistent with the disclosure. As shown in FIG. 1, the BIOS 102 is coupled to controller 104 via communications link 101. Communication link 101 may be any suitable link for transferring data from the BIOS 102 to the controller 104.

The controller 104 may be coupled to communication port 106 via communications link 105. In some examples, controller 104 may be a powered device (PD) controller. For example, controller 104 may support multiple levels of power of Ethernet as defined by the Institute of Electrical and Electronics Engineers, such as IEEE PoE, IEEE PoE+, IEEE PoE++, LTPoE++, etc.

As described above, the communication port 106 may be a communication interface such as a USB port through which information is transferred between a computing system and a peripheral device. In some examples, the communication port 106 may enter a locked state as a result of a failure of the firmware and/or drivers associated with the communication port 106. The communication port 106 may include a plurality of pins. For example, the communication port 106 may include two power pins (e.g., a bus pin and a ground pin), and two pins for differential data signals.

In some examples, the controller 104 may determine that the communication port 106 has entered the locked state. In response to the determination that the communication port 106 has entered the locked state, the controller 104 may send a first signal to the communication port 106 to power off a bus (e.g., bus pin) associated with the communication port 106 for a threshold period of time. The first signal may be sent via communications link 105. In some examples, the threshold period of time may be around one second; however, in some examples, the threshold period of time may be greater than one second or less than one second, and/or the threshold period of time may be configurable, for example via a user input.

In some examples, after the controller 104 has sent the first signal to the communication port 106, the controller 104 may send a second signal to the communication port 106 to recover the communication port 106. The second signal may be sent to power the bus associated with the communication port 106 back on. In some examples, the second signal may be sent in response to expiration of the threshold period of time. For example, after the bus associated with the communication port 106 has been powered off for one second, the second signal may be sent from the controller 104 to the communication port 106 to power the communication port 106 back on. In some examples, the controller 104 may send the first signal and/or the second signal to the communication port 106 as part of a power-on-self-test process.

As part of recovering the communication port 106 from the locked state, the first signal may cause a power signal associated with the bus to be driven to a low state (e.g., an off state), while the second signal may cause the power signal associated with the bus to be driven to a high state (e.g., an on state). In some examples, the low state may correspond to a voltage of zero volts being supplied to the communication port 106, while the high state may correspond to a voltage of five volts being driven across the communication port 106.

In some examples, the BIOS 102 may issue a command to initiate recovery of the communication port 106 from the locked state. For example, a command to recover the communication port 106 from the locked state may be generated at the BIOS 102 and sent to the controller 104 via communications link 101. In some examples, the command may be transmitted to the controller 104 as a virtual wire. Similarly, in some examples, the first command and/or the second command may be transmitted from the controller 104 to the communication port 106 as a virtual wire. As used herein, a "virtual wire" is a transmission containing a short message without addressing, retransmit, or acknowledgement features associated therewith. A virtual wire may utilize amplitude key shifting as part of its transmission protocol.

Figure 2:
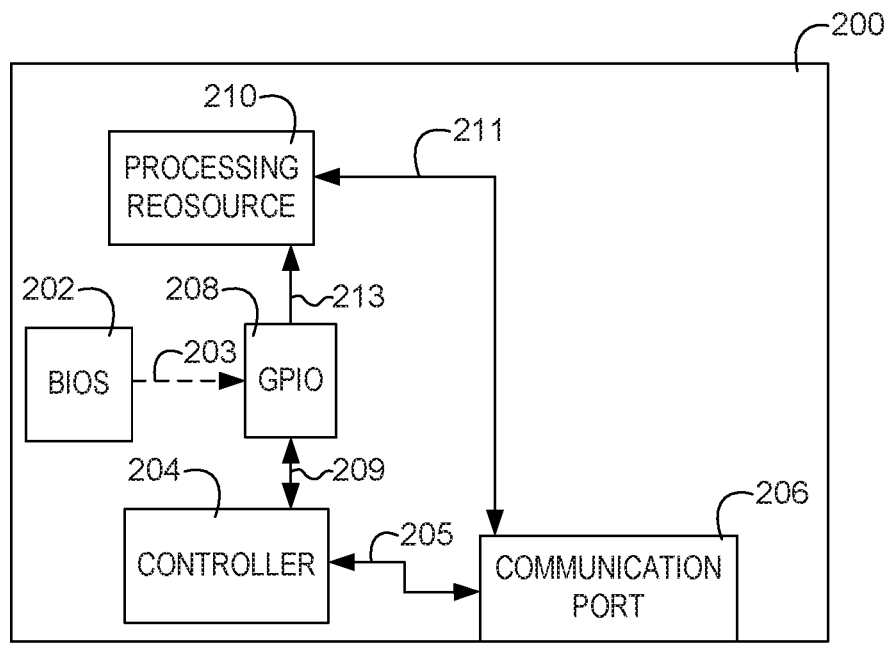
FIG. 2 illustrates an example of an electronic device including a basic input/output system, a controller, a general purpose input/output system, and communication port consistent with the disclosure.

FIG. 2 illustrates an example of an electronic device 200 including a basic input/output system (BIOS) 202, a controller 204, a general purpose input/output system (GPIO) 208, and communication port 206 consistent with the disclosure. As shown in FIG. 2, the BIOS 202 is coupled to GPIO 208 via communications link 203. Communication link 203 may be any suitable link for transferring data from the BIOS 202 to the GPIO 208.

The GPIO 208 may be coupled to the controller 204 via communication link 209, and the controller 204 may be coupled to communication port 206 via communications link 205. Communication link 205 may allow transfer of a configuration channel (CC) communication to and/or from the controller 204.

As used herein, a "configuration channel" may be used to establish and/or manage downstream facing ports (DFPs) and upstream facing ports (UFPs). In some examples, two configuration channels may be provided as two pins on the communication port 206, and may be used to facilitate communication between the DFPs and UFPs. The configuration channel(s) may also be used to resolve cable orientation and/or twist connections to establish bus routing associated with the communication port 206. In some examples, the configuration channels may be used to discover and/or configure other pins associated with the communications port 206 (or associated external cable) such as the $V_{BUS}$ pin and/or $V_{CONN}$ functions. In some examples, the CC communication may include a virtual wire.

In some examples, communication link 209 may include an inter-integrated circuit to provide intra-bound communication between the GPIO 208 and the controller 204. As shown in FIG. 2, the communication port 206 may be coupled to a processing resource 210 via communications link 211, and the processing resource 210 and the GPIO 208 may be coupled to one another via communications link 213.

The GPIO 208 may include one or more pins that are controllable (e.g., by a user) at run time. For example, the pin(s) of the GPIO 208 may not have a predefined purpose and may be unused by default. This allows for the pin(s) of the GPIO 208 to be used as digital control lines to assist in the transfer of data.

In some examples, controller 204 may determine that the communication port 206 has entered a locked state. In response to the determination that the communication port 206 has entered the locked state, the controller 204 may receive a command from the BIOS 202 to perform a power cycle operation on the communication port 206. Responsive to the command from the BIOS 202 to perform the power cycle operation on the communication port 206, the controller 204 may toggle the GPIO 208 for a configurable time period to power cycle the communication port 206 to recover the communication port 206. In some examples, the controller 204 may toggle the GPIO 208 for a configurable time period to power cycle the communication port 206 to recover the communication port 206 without power cycling the electronic device 200.

In some examples, the command form the BIOS 202 may be a system management BIOS call. As used herein, a "system management BIOS call" is a command that can be used to read information stored in the BIOS 202 of the electronic device 200.

As discussed above in connection with FIG. 2, the command from the BIOS 302 may include a virtual wire. The command from the BIOS 302 may be initiated without intervention from a user. For example, the command may be initiated from the BIOS 302 based on the determination that the communication port 206 has entered the locked state. The command may be initiated from the BIOS 302 in any power management state (e.g., the command may be initiated in an Sx sleep state, an S0 working state, or any intermediate power management state including warm reboot states and system restarts). In some examples, the controller 204 may decode the virtual wire prior to toggling the GPIO 208.

Figure 3:
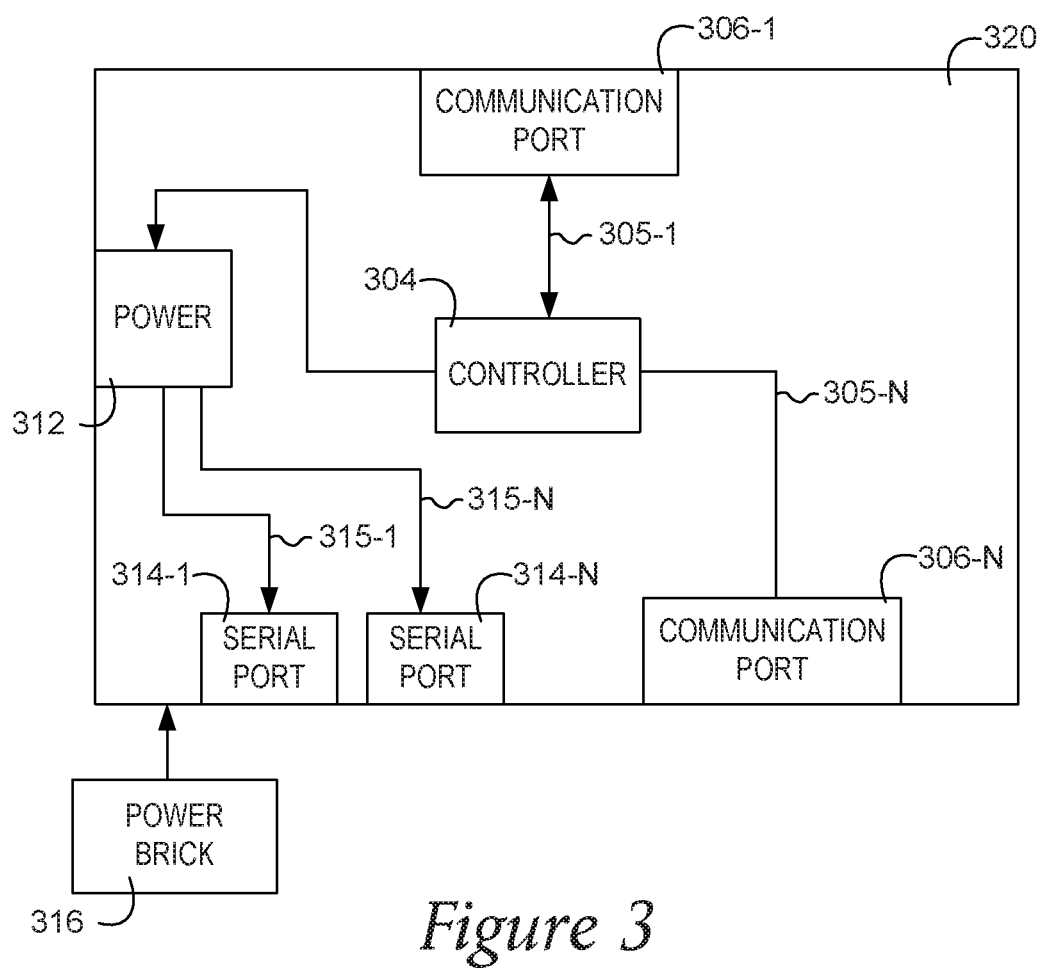
FIG. 3 illustrates an electronic device including a communication port, controller, and power supply consistent with the disclosure.

FIG. 3 illustrates an electronic device 320 including a communication port 306-1, . . . , 306-N, controller 304, and power supply 312 consistent with the disclosure. In some examples, the communication port 306-1 may be coupled via cable (e.g., a USB cable, USB 2.0 cable, USB 3.0 cable, etc.) to communication port 106 of the electronic device 100 illustrated in FIG. 1, or the communication port 206 of the electronic device 200 illustrated in FIG. 2.

As shown in FIG. 3, communication port 306-1 is coupled via communications link 305-1 to controller 304 and communication port 306-N is coupled via communications link 305-N to controller 304. The controller 304 may be coupled to power supply 312. In some examples, power supply 312 may be operable at around 5 volts, 12 volts, and/or 24 volts.

The power supply 312 may be coupled to serial ports 314-1, . . . , 314-N via respective power rails 315-1, . . . , 315-N, which may allow a voltage to be driven from the power supply 312 to the serial ports 314-1, . . . , 314-N. In some examples, controller 304 may control the amount of voltage power supply 312 drives via the power rails 315-1, . . . , 315-N to the serial ports 314-1, . . . , 314-N.

In some examples, the power supply 312 may also supply power to controller 304 and/or communication ports 306-1, . . . , 306-N. For example, the power supply 312 may provide a 5 volt potential to the communication ports 306-1, . . . , 306-N. In the event of a communication port 306-1, . . . , 306-N entering the locked state, the controller 304 may control the power supply 312 to toggle power supplied to the communication port 306-1, . . . , 306-N between 0 volts and 5 volts to recover the communication port 306-1, . . . , 306-N. For example, the power supply 312 may be controlled to toggle power supplied to a bus (e.g., a bus pin) associated with the communication port 306-1, . . . , 306-N to recover the communication port 306-1, . . . , 306-N from a locked state.

As described in more detail herein, the controller 304 may control the power supply 312 to toggle the power supply 312 responsive to a command from the BIOS (e.g., BIOS 202 illustrated in FIG. 2). In some examples, the power supply 312 may supply power to the controller 304.

The serial ports 314-1, . . . , 314-N allow for serial peripheral devices to be connected to the electronic device 320. Examples of serial peripheral devices include RS-232 compliant devices as well as other devices that send data in serial streams.

Power brick 316 may be coupled to the electronic device 320 to provide power to the electronic device 320. In some examples, the power brick 316 may supply around 120 Watts of power to the electronic device 320. In some examples, electronic device 320 may be physically separate from electronic device 200 illustrated in FIG. 2 and may therefore obtain power to operate from the power brick 316, which may be plugged into a standard wall power outlet. In some examples, the power brick 316 may provide power to the power supply 312, which may in turn provide power to the serial ports 314-1, . . . , 314-N, the controller 304, and/or communication ports 306-1, . . . , 306-N.

In some examples, the controller 304 may determine that the communication port 306-1, . . . , 306-N has entered the locked state. In response to the determination that the communication port 306-1, . . . , 306-N has entered the locked state, the controller 304 may send a first signal to the communication port 306-1, . . . , 306-N to power off a bus (e.g., bus pin) associated with the communication port 306-1, . . . , 306-N for a threshold period of time. The first signal may be sent via communications link 305-1, . . . , 305-N. In some examples, the threshold period of time may be around one second; however, in some examples, the threshold period of time may be greater than one second or less than one second, and/or the threshold period of time may be configurable, for example via a user input.

In some examples, after the controller 304 has sent the first signal to the communication port 306-1, . . . , 306-N, the controller 304 may send a second signal to the communication port 306-1, . . . , 306-N to recover the communication port 306-1, . . . , 306-N. The second signal may be sent to power the bus associated with the communication port 306-1, . . . , 306-N back on. In some examples, the second signal may be sent in response to expiration of the threshold period of time. For example, after the bus associated with the communication port 306-1, . . . , 306-N has been powered off for one second, the second signal may be sent from the controller 304 to the communication port 306-1, . . . , 306-N to power the communication port 306-1, . . . , 306-N back on. In some examples, the controller 304 may send the first signal and/or the second signal to the communication port 306-1, . . . , 306-N as part of a power-on-self-test process.

As part of recovering the communication port 306-1, . . . , 306-N from the locked state, the first signal may cause a power signal associated with the bus to be driven to a low state (e.g., an off state), while the second signal may cause the power signal associated with the bus to be driven to a high state (e.g., an on state). In some examples, the low state may correspond to a voltage of zero volts being supplied to the communication port 306-1, . . . , 306-N, while the high state may correspond to a voltage of five volts being driven across the communication port 306-1, . . . , 306-N.

In some examples, the BIOS (e.g., BIOS 202 illustrated in FIG. 2) may issue a command to initiate recovery of the communication port 306-1, . . . , 306-N from the locked state. The command may be received at the communication port 306-1, . . . , 306-N via a cable, as described above. For example, a command to recover the communication port 306-1, . . . , 306-N from the locked state may be generated at the BIOS and sent to the communication port 306-1, . . . , 306-N via the cable. In some examples, the command may then be sent to the controller 304 via communications link 305-1. In some examples, the command may be transmitted to the controller 304 as a virtual wire. Similarly, in some examples, the first command and/or the second command may be transmitted from the controller 304 to the communication port 306-1, . . . , 306-N as a virtual wire.

Figure 4:
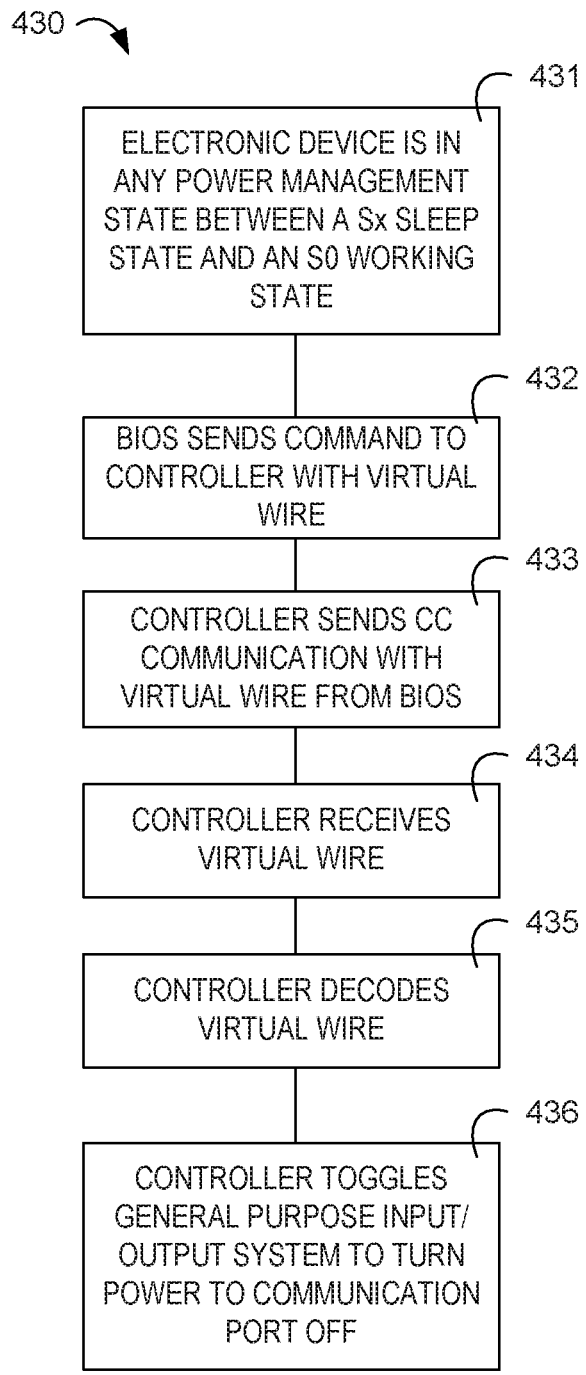
FIG. 4 illustrates an example flow diagram for communication port recovery consistent with the disclosure.

FIG. 4 illustrates an example flow diagram 430 for communication port recovery consistent with the disclosure. At block 431, an electronic device (e.g., electronic device 100 illustrated in FIG. 1, electronic device 200 illustrated in FIG. 2, electronic device 320 illustrated in FIG. 3) may be in any power management state. For example, the electronic device may be in an Sx (or G1) sleep state (e.g., an S1 power on suspend state, an S2 CPU powered off state, an S3 standby state, or an S4 hibernation state), or an S0 (or G0) working state.

At block 432, the BIOS (e.g., BIOS 102 illustrated in FIG. 1, BIOS 202 illustrated in FIG. 2) may send a command to a controller (e.g., controller 104 illustrated in FIG. 1, controller 204 illustrated in FIG. 2, controller 304 illustrated in FIG. 3). In some examples, the command may include a virtual wire. The command may be sent as part of an operation to recover a communication port (e.g., communication port 106 illustrated in FIG. 1, communication port 206 illustrated in FIG. 2, communication ports 306-1, . . . , 306-N illustrated in FIG. 3) from a locked state.

At block 433, the controller may send a CC communication from the BIOS. In some examples, the CC communication may include a virtual wire. At block 434, the controller may receive the virtual wire. Subsequent to receipt of the virtual wire, at block 435, the controller may decode the virtual wire.

At block 436, the controller may toggle a general purpose input/output (GPIO) system (e.g., GPIO 208 illustrated in FIG. 2) to turn power to the communication port off. Turning power off to the communication port may occur as part of an operation to recover the communication port from a locked state. In some examples, the controller may toggle the GPIO for a configurable time period to power cycle the communication port to recover the communication port without power cycling the electronic device.

Figure 5:
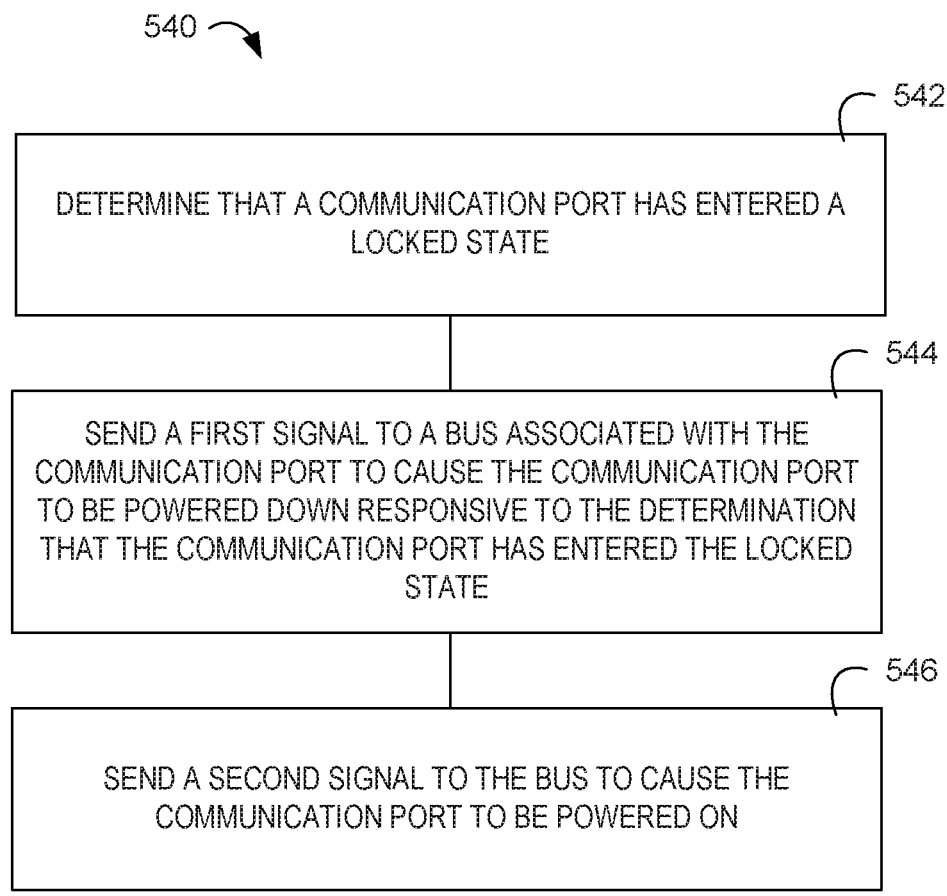
FIG. 5 illustrates an example flow diagram of a method for communication port recovery consistent with the disclosure.

FIG. 5 illustrates an example flow diagram of a method 540 for communication port recovery consistent with the disclosure. At block 542, the method 540 may include determining that a communication port has entered a locked state. In some examples, the method 540 may further include determining that the communication port has entered the locked state as a result of a firmware or driver failure.

At block 544, the method 540 may include sending a first signal to a bus associated with the communication port to cause the communication port to be powered down responsive to the determination that the communication port has entered the locked state. In some examples, the communication port may be powered down as part of an operation to recover the communication port from the locked state.

At block 546, the method 540 may include sending a second signal to the bus to cause the communication port to be powered on. In some examples, the communication port may be powered on as part of an operation to recover the communication port from the locked state.

In some examples, the method 540 may further include sending the first signal for a configurable threshold period of time, and sending the second signal after the configurable threshold period of time has expired to recover the communication port. The first signal may be sent to the bus in response to a BIOS command.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. As used herein, designators such as "N", etc., particularly with respect to reference numerals in the drawings, indicate that a number of the particular feature so designated can be included. A "plurality of" is intended to refer to more than one of such things.

What is claimed is:

1. An apparatus, comprising:
   an electronic device including a controller; and
   a communication port coupled to the controller, the controller to:
     determine that the communication port has entered a locked state;
     send, via a virtual wire, a first signal to the communication port to power off a bus associated with the communication port for a threshold period of time; and
     send a second signal to the communication port to power on the bus associated with the communication port in response to expiration of the threshold period of time to recover the communication port.

2. The apparatus of claim 1, wherein the threshold period of time is substantially equal to one second.

3. The apparatus of claim 1, wherein the first signal is to cause a power signal associated with the bus to be driven to a low state; and the second signal is to cause the power signal associated with the bus to be driven to a high state.

4. The apparatus of claim 1, wherein the controller is to send the first signal and the second signal via the virtual wire.

5. The apparatus of claim 1, wherein the controller is to send the first signal in response to receipt of a command from a basic input/output system (BIOS).

6. The apparatus of claim 1, wherein the controller is to send the first signal and the second signal as part of a power-on-self-test process.

7. A system, comprising:
   an electronic device including a basic input/output system (BIOS) coupled to a controller;
   a communication port coupled to the controller; and
   a general purpose input/output (GPIO) system coupled to the controller and the communication port, wherein the controller is to:
     determine that the communication port has entered a locked state;
     responsive to the determination that the communication port has entered locked state, receive a command from the BIOS to perform a power cycle operation on the communication port; and
     responsive to receipt of the command from the BIOS, toggle the GPIO for a configurable threshold period of time to perform the power cycle operation on the communication port to recover the communication port.

8. The apparatus of claim 7, wherein the command comprises a system management BIOS call.

9. The apparatus of claim 7, wherein the controller is to toggle the GPIO for a configurable threshold period of time to power cycle the communication port without power cycling the electronic device.

10. The system of claim 7, wherein the command from the BIOS is received by the controller via a virtual wire.

11. The system of claim 7, wherein the configurable threshold period of time is substantially equal to one second.

12. The system of claim 7, wherein the controller is to send the first signal and the second signal as part of a power-on-self-test process.

13. The apparatus of claim 10, wherein the controller is to decode the virtual wire prior to toggling the GPIO.

14. A method, comprising:
   determining that a communication port has entered a locked state;
   sending, during a power-on-self-test, a first signal to a bus associated with the communication port to cause the communication port to be powered down responsive to the determination that the communication port has entered the locked state; and
   sending a second signal to the bus to cause the communication port to be powered on.

15. The method of claim 14, further comprising:
   sending the first signal for a configurable threshold period of time; and
   sending the second signal after the configurable threshold period of time has expired to recover the communication port.

16. The method of claim 14, further comprising sending the first signal to the bus in response to a basic input/output system (BIOS) command.

17. The method of claim 14, further comprising determining that the communication port has entered the locked state as a result of a firmware or driver failure.

18. The method of claim 14, wherein the first signal is to power off the bus associated with the communication port for a threshold period of time that is substantially equal to one second.

19. The method of claim 14, wherein the controller is to send the first signal and the second signal via a virtual wire.

* * * * *